UNITED STATES PATENT OFFICE.

HENRY FINK AND CATHRINE FINK, OF BALTIMORE, MARYLAND.

IMPROVEMENT IN LUBRICATING-OILS.

Specification forming part of Letters Patent No. 127,328, dated May 28, 1872.

*To all whom it may concern:*

Be it known that we, HENRY FINK and CATHRINE FINK, of Baltimore, in the county of Baltimore and in the State of Maryland, have invented certain new and useful Improvements in Lubricating-Oil; and do hereby declare that the following is a full, clear, and exact description thereof.

The nature of our invention consists in a composition or mixture to be mixed with oil to form a lubricating-oil for machinery, as will be hereinafter more fully set forth.

To make one barrel of thirty-three gallons of the mixture, we take: Two pounds of pulverized lime; seven ounces of pulverized French chalk, and three ounces of carbonate of potash, and dissolve the same in a bucket of warm water. Then put the same in the barrel, and fill the barrel with soft water.

This mixture may be used with various kinds of oils, and is to be mixed with the same quantity of oil, gallon for gallon, as wanted for use.

To give the lubricating-oil more body, take one gallon of oil to two gallons of the mixture. Shake well before using.

If coal-oil is used, five gallons of lard-oil or melted grease must be put in a barrel of coal-oil before mixing with the mixture.

We do not confine ourselves to any precise proportions of the ingredients named, as they may be varied to suit the oil with which the mixture is used, the climate in which the lubricating-oil is to be used, or for other reasons.

We are aware that a lubricating-oil wherein steatite is used is not new. Hence, we disclaim the use of such as any part of our invention.

By the use of the specific article known as French chalk, with the ingredients specified, we are enabled to make an oil that has no grit or other injurious substance.

Having thus fully described our invention, what we claim as new, and desire to secure by Letters Patent, is—

1. The within-described mixture, composed of pulverized lime, pulverized French chalk, carbonate of potash, and water, for the purposes herein set forth.

2. A lubricating-oil, composed of the composition or mixture herein described, and mixed with oil, substantially as herein set forth.

In testimony that we claim the foregoing we have hereunto set our hands this 6th day of April, 1872.

HENRY FINK.
    CATHRINE FINK.

Witnesses:
 GEO. V. METZEL,
 GEORGIA FINK.